Aug. 22, 1933.    F. SMITH    1,923,235
STEERING AND OTHER DAMPING DEVICE FOR AUTOMOBILES
Filed July 7, 1930    2 Sheets-Sheet 1
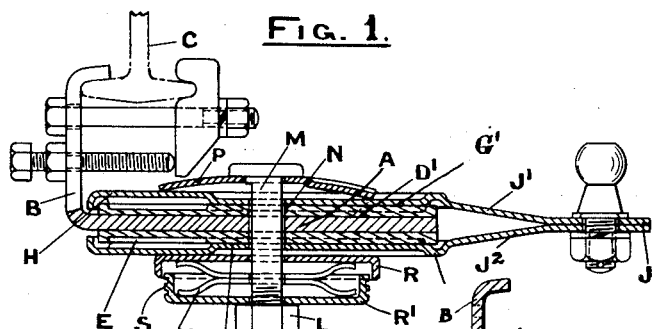
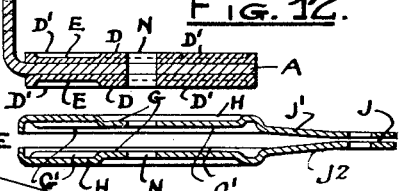
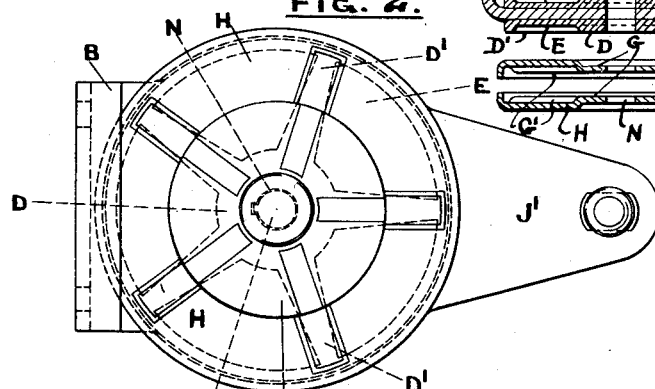
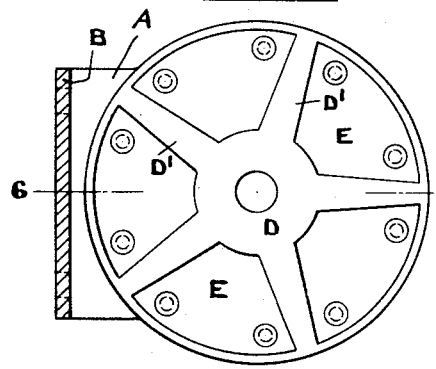
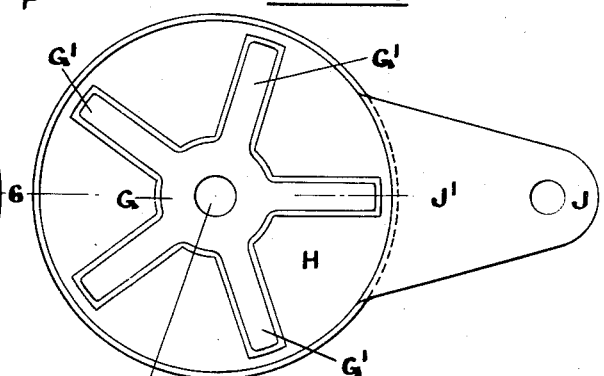
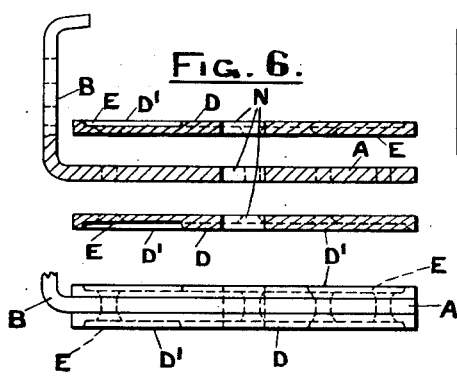
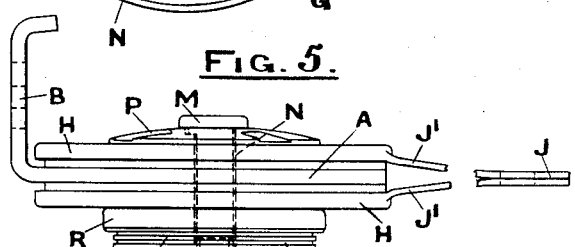

Aug. 22, 1933.   F. SMITH   1,923,235
STEERING AND OTHER DAMPING DEVICE FOR AUTOMOBILES
Filed July 7, 1930   2 Sheets-Sheet 2
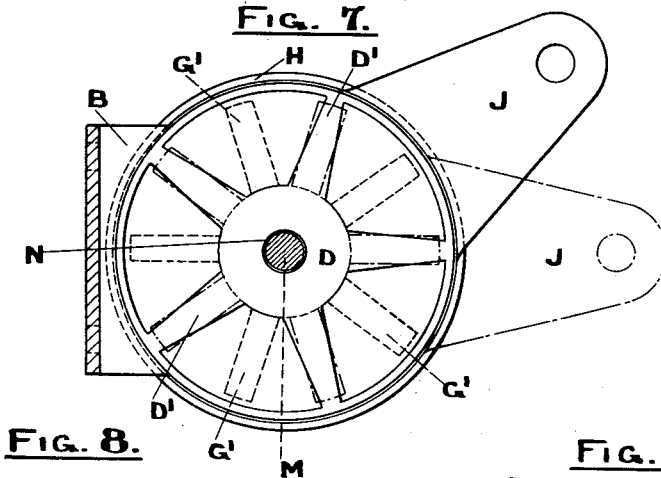
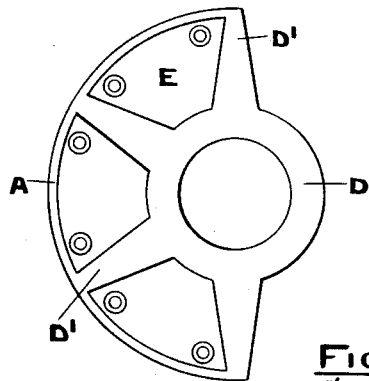
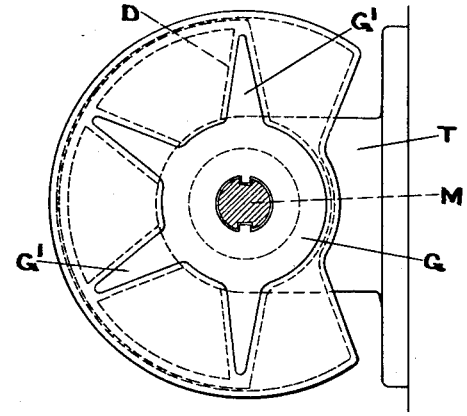
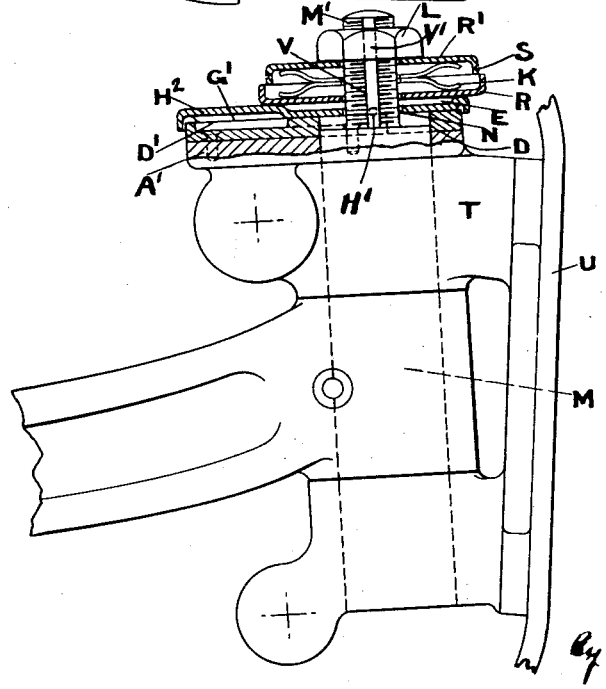
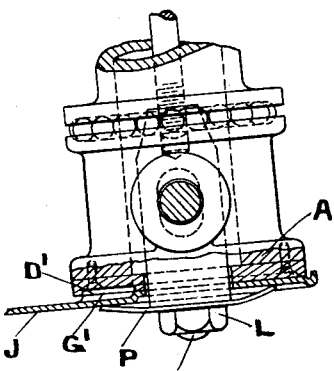

Patented Aug. 22, 1933

1,923,235

UNITED STATES PATENT OFFICE 1,923,235

STEERING AND OTHER DAMPING DEVICE FOR AUTOMOBILES

Frank Smith, Elland, England

Application July 7, 1930, Serial No. 466,300, and in Great Britain September 12, 1929

5 Claims. (Cl. 188—130)

This invention relates to damping devices for automobiles, of the kind employed for eliminating wobble and "shimmying" of the front wheel or wheels by preventing the transmission of shocks to the steering wheel or post, also for controlling the action or flexion of said vehicle springs, or for similar purposes; and has for its object an improved construction of damping device wherein a plurality of single plane friction surfaces of novel construction are provided on a number of superposed or contiguous plates or discs on the bolt or the like of a spring device adapted to clamp the said plates together in the well known manner. The friction surfaces on each plate are so formed that a central portion remains in continuous engagement with the corresponding opposing surface of the adjacent plate or plates, while separate continuations thereof or separate sections in the same plane are adapted to increasingly or decreasingly engage during a turning movement by the steering wheel or the like of the vehicle. One or more of these plates is or are preferably adapted to be moved relative to a fixed plate or plates provided with one or more sets of fabric friction surfaces, or, one or more of these plates may be adapted to move in an opposite direction to that of other similar plates.

The central portions of the friction surfaces of each plate in constant engagement maintains a minimum restraint adapted when applied to a steering damper, to absorb the vibrations of the front axle, swivel pins, or the track-rod, and prevent them affecting the steering wheel or the like. The engagement of these central surfaces maintains a uniform load on the spring device holding them together, during the whole or any part of a turning movement, while the continuation surfaces thereof moving over space as they decreasingly engage, continue in the same plane. These continuations are adapted to increasingly or decreasingly engage during the turning of the steering wheel or the like. In a steering damper the maximum engagement of the friction surfaces takes place when the said surfaces register, for the purpose of imparting a corresponding restraint to the movement of said wheel. The improved damping device may be secured to the front axle of automobiles and connected to the track-rod of the stub-axle thereof; or, it may be mounted on the swivel pins of said stub-axles; or, on the steering head of a motor cycle.

In a steering damper, the aforesaid friction surfaces on all the plates are adapted to register when the steering wheel is set for the vehicle travelling a straight path, offering the greatest resistance to any turning movement thereof. Should the steering wheel be turned to negotiate a bend or corner in the road, the turning of the steering wheel moves certain of the said friction surfaces more or less out of engagement, reducing the restraint or braking effect on the wheel in a corresponding degree. Upon a reversal of the said wheel as the vehicle begins to again enter a further straight portion of the road, the said surfaces increasingly engage until their engagement and restraint reaches the maximum. In this manner the greatest resistance is offered to any turning movement of the road steering wheels when the vehicle is pursuing a straight path, while the more acute the diversion from the straight line the path becomes, the less the resistance offered to the turning of said wheel and incidentally to the steering of the vehicle.

I attain these objects by the means illustrated in the accompanying drawings, in which:—

Fig. 1 is a sectional side elevation of the invention as applied to steering dampers.

Fig. 2 is a plan view of the invention applied to steering dampers shown at Fig. 1.

Fig. 3 is a sectional plan view of the central element or plate of the damping device shown at Figs. 1 and 2, adapted to be secured to the vehicle front axle.

Fig. 4 is a plan view of one of the two plates with integral arms, adapted to engage the opposing friction surfaces of Fig. 3.

Fig. 5 shows a side elevation of Fig. 2.

Fig. 6 comprises a sectional side elevation through the line 6—6 of Fig. 3, of the elements comprised therein dismantled, and in full, the said elements assembled.

Fig. 7 is a sectional plan view of improved damper with one of the plates removed, to show in full and chain lines the relative position of the friction surfaces required for traveling a straight path, and in full and dotted lines the position when the steering wheel is in full lock.

Figs. 8 and 9 are plan views of modified plates provided with friction surfaces, adapted for use when applying the invention to the swivel pins of stub-axles of automobiles or to the steering heads of motor cycles.

Fig. 10 is a sectional elevation of the invention as applied to the swivel pin of a fragmentary part of a stub-axle.

Fig. 11 is a sectional elevation of the invention as applied to the steering head of a motor cycle or the like.

Figure 12 is a transverse medial sectional view of Figure 3.

Figure 13 is a transverse medial sectional view of Figure 4.

Similar letters refer to similar parts throughout the several views.

According to the present invention, one of the superposed or contiguous plates A is composed of metal to one or both sides of which is secured a disc or plate preferably composed wholly of fabric friction material provided with a plurality of raised friction surfaces D, D¹, thereon, or, alternatively, the friction surfaces may consist of separate projections or insertions secured to said plate A. The friction surface D is disposed concentric to a central bore in the plate A, and D¹ are arms preferably slightly tapered radiating therefrom or said surfaces may comprise radial sections with alternating recesses E between said arms or sections. G, G¹, are similar surfaces formed on metal discs or plates H, adapted to engage the surfaces D, D¹, of the plate A (as clearly shown at Figs. 1 and 4). The plates A and H and their friction surfaces are held in engagement by means of a bolt M or its equivalent passing through the central bores N therein in the well known manner, the said bolt carries a spider spring or springs K on one side of the abutting plates and a spring washer P abutting on the bolt head and engaging one of the plates H, adapted to exercise and equalize a resilient pressure thereon when screwing up the nut L in the well known manner.

R, R¹, are cover plates or flanged washers telescopically arranged on said bolt so as to enclose the springs K to prevent foreign matter gaining access thereto and interfering with their efficiency. The intruding washer R¹ may also be provided with indicating means thereon whereby the tension on the said friction surfaces may be adjusted and indicated to a predetermined amount.

On application to one variety of steering damper the plate A is provided with an integral arm B adapted to be secured by any suitable or well known means to the front axle C of the vehicle. The plates H, H, are also provided with integral arms J¹, J², which converge forming a lever J adapted to be secured to and operated by the track rod controlled by the steering wheel (see Figs. 1 to 5). In another application the device is mounted on the swivel pins M' of the stub-axles as is clearly shown at Fig. 10; the plate A is secured to or formed integral with the stub-axle bracket T of each front wheel U and is movable therewith; the plate H² is slidably mounted on a reduced screwed portion V of the pin M', and prevented from oscillating thereon by means of a snug H¹ thereon engaging a groove V¹ in the part V, otherwise, the action of the friction surfaces D, D¹, of the said plate A on the surfaces G, G¹, of the plate H, and the effect produced thereby on the steering head, is the same as that obtained by the device shown at Fig. 1. The improved damping device may also be applied to the steering head of a motor cycle (see Fig. 11), the plate A with the friction surfaces D¹, being secured to the steering column T; while the plate H with the friction surface G' remains a fixture secured to the cycle frame.

What I claim as my invention, and desire to secure by Letters Patent, is:—

1. In combination with the steering device of a motor vehicle, of means for varying the braking action upon the turning of the steering device from its normal straight path, said means including opposed plates, each plate having a portion maintained in continuous engagement with a corresponding portion of the other plate during a turning movement of the device and spaced radial portions normally in engagement with corresponding portions on the other plate, so as to exercise a maximum braking effect on the steering device and to reduce their frictional engagement upon the turning of the steering device from its straight path.

2. In combination with a steering device of a motor vehicle, of means for varying the braking action upon the turning of the steering device from its normal straight path, said means including opposed plates having central openings, a retaining bolt extending through the openings, yieldable means for maintaining the plates in engagement, said plates having substantially centrally disposed opposed portions maintained in continuous frictional engagement and spaced radial portions extending outwardly from the central portions and arranged to vary their frictional engagement with one another during turning movement of the device, said radial portions being in engagement when the steering device is in its normal straight path, so as to exercise a maximum braking effect on the steering device.

3. In combination with a steering device of a motor vehicle, of means for varying the braking action upon the turning of the steering device from its normal straight path, said means including a metallic plate, friction discs engaging opposite sides of said plate and having spaced raised portions, closure plates having correspondingly formed raised portions adapted to be brought into varying frictional engagement with said first mentioned raised portions upon the turning of the device, said raised portions being normally in engagement with each other, so as to exercise a maximum braking effect on the steering device when the latter is in its normal straight path, and yieldable means for maintaining the plates and discs in position.

4. In combination with the steering device of a motor vehicle, of means for varying the braking action upon the turning of the steering device from its normal straight path, said means including a plate, friction discs engaging opposite sides of said plate and having a medial portion and spaced, outwardly extending radial portions, closure plates arranged to engage said discs and having correspondingly formed medial and radial portions, said radial portions being in engagement with each other when the steering device is in its normal straight position and arranged to vary their frictional engagement upon turning movement of said device, a bolt extending through said plates and discs, and yieldable means associated with said bolt for maintaining the parts in position.

5. In combination with the steering device of a motor vehicle, of means for varying the braking action upon the turning of the steering device from its normal straight path, said means including a horizontally disposed plate connected to the steering device, fabric discs on opposite sides of said plate, each of said discs having raised, medial portions and spaced tapered radial portions, closure plates arranged to engage said discs and having correspondingly formed medial and radial portions, said medial portions being maintained in constant engagement with each other and said radial portions arranged to engage when the steering device is in its normal straight path, and be moved out of engagement when the steering device is turned from its normal straight path.

FRANK SMITH.